R. W. MARVELL.
SELF HEATING SOLDERING IRON.
APPLICATION FILED OCT. 12, 1912.

1,107,813.

Patented Aug. 18, 1914.

Witnesses
Edwin L. Bradford
G. Ferd. Vogt

Inventor
Roy W. Marvell
By Mann & Co.
Attorneys

UNITED STATES PATENT OFFICE.

ROY W. MARVELL, OF BALTIMORE, MARYLAND, ASSIGNOR, BY MESNE ASSIGNMENTS, TO LYON, CONKLIN & COMPANY, A CORPORATION OF DELAWARE.

SELF-HEATING SOLDERING-IRON.

1,107,813.  Specification of Letters Patent.  Patented Aug. 18, 1914.

Application filed October 12, 1912. Serial No. 725,402.

*To all whom it may concern:*

Be it known that I, ROY W. MARVELL, a citizen of the United States, residing at Baltimore, in the State of Maryland, have invented certain new and useful Improvements in Self-Heating Soldering-Irons, of which the following is a specification.

This invention relates to certain improvements in hand-operated soldering irons of that type which are heated by gas produced from fluid hydro-carbon stored in a chamber attached to the iron or the handle.

When a soldering tool of this type is used out of doors where it is exposed to the wind or a strong draft of air, it often happens that the wind so interferes with the primary air-inlets as to prevent the proper admixture of air with the gas.

Therefore one object of the invention is to provide for the primary air-inlets an improved exterior guard sleeve that will prevent the wind or a draft of air from hindering the proper admission of air.

Other objects of this invention are to provide means that will prevent the combustion chamber which is immediately adjacent the solder-applying copper, from being chilled by exterior air-currents, and also that will cause the hot products of combustion, that escape from the combustion chamber, to be applied directly to said solder-applying copper.

Figure 1:
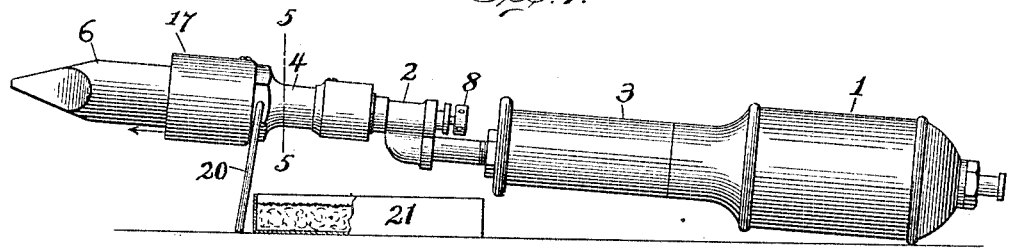
Figure 2:
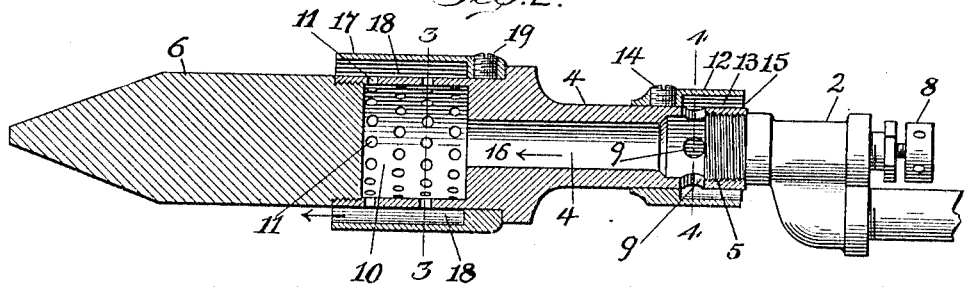
Figure 3:
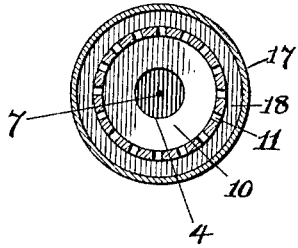
Figure 4:
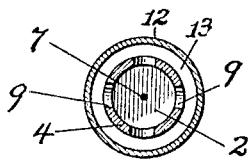
Figure 5:
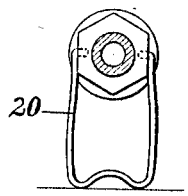

In the drawing, Figure 1 is a side view of the improved soldering tool in position for the preliminary heating. Fig. 2 is a longitudinal section of a portion of the tool. Fig. 3 is a cross-section on the line 3—3 of Fig. 2. Fig. 4 is a cross-section on the line 4—4 of Fig. 2. Fig. 5 is a cross-section on the line 5—5 of Fig. 1.

The numeral, 1, designates the chamber in which the fluid hydro-carbon is carried; the numeral, 2, denotes the valve casing where the gas is formed, and the part that connects the fluid-chamber and valve casing is designated, 3, and this part serves as a handle for the operator to grasp. An air and gas mixing tube, 4, is attached by a screw-thread, 5, to the valve casing, 2. The valve casing, 2, has a small aperture, 7, that opens into the end of the mixing tube, 4; the gas escapes from this aperture into the mixing tube and the aperture itself is controlled in the well-known way by the cone-point of a screw-needle whose head is designated, 8.

The mixing tube, 4, has at its side adjacent the valve casing, 2, air-inlets, 9, through which the atmosphere enters to the interior of the tube, 4. When the metal parts of the valve casing and mixing tube have been heated and the head, 8, of the needle-valve has been turned, gas under pressure from the valve casing, 2, will issue from the small hole, 7, and mix with air that enters at the inlets, 9, and both gas and air will mix while passing forward to the enlarged combustion chamber, 10, the wall of which has numerous holes, 11, from which will issue flames and hot products of combustion that surround the exterior of said walls. The end of the combustion chamber, 10, is closed by the solder-iron point, 6.

Now one feature of my improvements consists of an exterior guard sleeve, 12, which surrounds the screw connection, 5, and the air-inlets, 9, of the mixing tube, 4, leaving an annular space, 13, between the wall of the said guard sleeve and the wall of the tube, 4. This guard sleeve has one end contracted to fit tight around the said mixing tube, and a set-screw, 14, at said contracted end impinges against the mixing tube and holds the sleeve firmly to the position at which it may be adjusted; the annular space is closed at that end where the guard sleeve is contracted and fits tightly, but the said space, 13, at the opposite end, 15, of the sleeve is open. The current of gas and air moves through the mixing tube in the direction indicated by dart, 16. It will be seen that the closed end of the sleeve is near the air inlets, 9, and the sleeve covers the air inlets while the open end, 15, of the sleeve is nearest the valve casing, 2. The air enters the open end, 15, of the sleeve, moves forward away from the valve casing and passes through the inlets, 9, to the mixing tube, 4. By loosening the screw, 14, the sleeve may be moved and the position of its open end relative to the inlets, 9, may be changed, so that the open-end may be nearer the said inlets than shown in the drawing. In addition to the result of preventing wind from hindering the proper admission of air into the mixing tube, this sleeve also increases the air-draft and causes a greater proportion of air to enter, which improves the heating power.

When soldering tools of this character are used where there is an exposure to the wind, the heat and flames issuing from the holes, 11, of the combustion chamber instead of heating the solder-applying point, 6, are blown off sidewise and such heat is lost in the atmosphere and not only is heat lost that should be applied to the soldering point, but the direct exposure of the wall of the combustion chamber, 10, to the wind, has been found to materially reduce the heat of said chamber; to avoid this I provide a sleeve, 17, large enough to exteriorly surround the cylindric wall of the combustion chamber, 10, and form an annular space, 18, into which all the holes, 11, open. At the end next to the soldering point, 6, the said annular space is open, but at the other end, nearest the mixing tube, said space is closed; a set-screw, 19, serves to confine the sleeve and keep it from movement. The operation of this sleeve, 17, is most advantageous in its results of applying the hot products of combustion directly to the "copper" or soldering iron, 6. The heat and flames that issue from the holes, 11, enter the annular space, 18, and then are directed forward onto and around the soldering iron, 6, which is thereby well heated; by this device no heat is lost in the atmosphere.

A supporting leg, 20, has one end suitably pivoted to the device so as to sustain the solder-applying point, 6, in a slightly elevated position when the device is resting on top of a work bench, as in Fig. 1.

The numeral, 21, designates a block or pad capable of absorbing a small quantity of alcohol, or any fluid hydro-carbon, which, when lighted, will heat the combustion chamber and valve casing, 2, sufficiently to start the generation of gas.

Having thus described my invention what I claim and desire to secure by Letters Patent is:—

In a soldering iron, the combination of an air-and-gas mixing tube, 4; a cylindrical combustion chamber attached to said mixing tube and the wall of said chamber provided with exit-holes; a solder copper whose exterior diameter is the same as that of said wall; and a straight tubular sleeve, 17, attached only around the end of said mixing tube and being longer than said combustion chamber and completely surrounding the latter throughout its length and forming an annular space which is closed at the mixing-tube end and open at the other end.

In testimony whereof I affix my signature in presence of two witnesses.

ROY W. MARVELL.

Witnesses:
G. FERD. VOGT,
CHAS. B. MANN.

---

Copies of this patent may be obtained for five cents each, by addressing the "Commissioner of Patents, Washington, D. C."